Patented June 15, 1954

2,681,341

UNITED STATES PATENT OFFICE 2,681,341

SOLID ACID SALTS OF N,N-DIETHYL PYRIDINE-3-CARBOXYLIC ACID AMIDE

Georg E. Cronheim and Philip Lucas, Bristol, Tenn., assignors to The S. E. Massengill Company, Bristol, Tenn., a corporation of Tennessee No Drawing. Application August 19, 1952, Serial No. 305,304

10 Claims. (Cl. 260—295.5)

This invention relates to new organic compounds, more specifically to new solid acid salts of N,N-diethyl pyridine-3-carboxylic acid amide, said new compounds having highly advantageous properties as therapeutic agents, and to processes for making same.

This is a continuation-in-part of our application Serial Number 65,068 filed December 13, 1948, and now abandoned.

The compound, N,N-diethyl pyridine-3-carboxylic acid amide has been employed for many years as a respiratory and cardiac stimulant. Also known as "nikethamide," it has been recognized as a therapeutic agent by the Council on Pharmacy and Chemistry of the American Medical Association. Unfortunately, the compound possesses certain characteristics which make accurate administration difficult. At ordinary temperatures, nikethamide is a viscous oil. It is water soluble and is usually administered orally or parenterally in the form of a 25% aqueous solution. An oral dose is usually prescribed by indicating the number of drops to be taken. For the average oral dose, the number of drops vary from 15 to 45. The measurement of potent drugs by counting drops is definitely undesirable both because of its inaccuracy and the likelihood of individual error, as for example, miscounting. Administration in the form of tablets or capsules is considerably more accurate and practical, but because nikethamide is an oil at ordinary temperatures, it has hitherto been impossible to employ it in such a manner.

An object of this invention is to provide new acid salts of N,N-diethyl pyridine-3-carboxylic acid amide which are solids at ordinary temperatures.

Another object is to provide new acid salts of N,N-diethyl pyridine-3-carboxylic acid amide which possess potent therapeutic properties, and which may be accurately administered in the form of tablets, capsules or the like.

Other objects and advantages will become apparent from the following description.

We have discovered that under suitable conditions, N,N-diethyl pyridine-3-carboxylic acid amide will react with certain acids to form solid crystalline salts. Since the di-substituted amide is very weakly basic, very weak acids will not give the desired reaction and it is necessary to employ acids which are at least moderately strong, as for example, tartaric acid, oxalic acid, maleic acid and fumaric acid. The reaction in all cases is equimolar regardless of the number of acidic hydrogen ions available.

In general, the desired new acid salts are obtained by admixing the particular acid with the nikethamide, which is preferably dissolved in a suitable solvent. The product either precipitates directly or is caused to separate by the addition of a suitable precipitating agent. The product is separated from the reaction mixture in any desired fashion, as by decanting, filtration and the like.

The various means of attaining the objects of this invention will be more readily understood from the following detailed description, which, however, does not limit the scope of the invention in any way.

Example I

A solution of 8.9 grams of nikethamide is dissolved together with 7.5 grams of tartaric acid in 35 ml. of alcohol. Upon the addition of ether an oily precipitate is obtained which crystallizes after standing for a short time. The precipitate may be recrystallized from an alcohol-ether mixture. The resulting N,N-diethyl pyridine-3-carboxylic acid amide tartrate melts at 90 to 92° C.

Example II

A solution of 0.9 gram of nikethamide dissolved in ether is treated with 0.7 gram of oxalic acid. An oily precipitate develops which crystallized on standing. After recrystallization from acetone, N,N-diethyl pyridine-3-carboxylic acid amide oxalate is obtained with a melting point of 95° to 97° C.

Example III

A mixture of 17.8 grams (0.1 mol.) of nikethamide and 5.8 grams (0.05 mol.) of fumaric acid was heated at 85° C. until it became clear. Upon cooling, the melt solidified. The product had a melting point of 83–6° C. After recrystallization from ethanol, the N,N-diethyl pyridine-3-carboxylic acid amide fumarate is a white crystalline solid which melts as 83–6° C. Fumaric acid content, percent: calc. 24.6; found, 24.7. The same product is formed if a solvent such as isopropanol is used in the preparation.

Example IV

A mixture of 17.8 grams (0.1 mol.) of nikethamide and 11.6 grams (0.1 mol.) of maleic acid was dissolved in 50 ml. ethanol by warming on a steam bath. After cooling and adding petroleum ether (B. P. 30–60° C.) an oil separated, which crystallized slowly to a white solid. After filtering and drying, the product weighed 9.5 grams. The N,N-diethyl pyridine-3-carboxylic acid amide maleate melted with decomposition at 120–45° C. after preliminary softening at 83° C.

The acid salts of our invention possess therapeutic properties which are substantially similar to those of the parent base. They exert similar action on blood pressure, respiration and pulse. In tests to determine their toxicity, the acid salts have proven to have practically the same acute toxicity as equivalent amounts of the parent compound. Because of their solid, crystalline characteristics, the acid salts may be accurately dispensed in tablet or capsule form.

We have found the tartaric acid salt to be particularly suitable for therapeutic administration both because of its great stability and the ready toleration of the acid component.

Although this invention has been described with reference to illustrative embodiments thereof, it will be apparent to those skilled in the art that the principles of this invention may be embodied in other forms but within the scope of the appended claims.

We claim:

1. The solid acid salts selected from the group consisting of N,N-diethyl pyridine-3-carboxylic acid amide tartrate, N,N-diethyl pyridine-3-carboxylic acid amide oxalate, N,N-diethyl pyridine-3-carboxylic acid amide fumarate and N,N-diethyl pyridine-3-carboxylic acid amide maleate, said compounds having therapeutic properties.

2. The compound N,N-diethyl pyridine-3-carboxylic acid amide tartrate.

3. The compound N,N-diethyl pyridine-3-carboxylic acid amide oxalate.

4. The compound N,N-diethyl pyridine-3-carboxylic acid amide fumarate.

5. The compound N,N-diethyl pyridine-3-carboxylic acid amide maleate.

6. The process for making solid acid salts of N,N-diethyl pyridine-3-carboxylic acid amide which comprises reacting N,N-diethyl pyridine-3-carboxylic acid amide with an acid selected from the group consisting of tartaric acid, oxalic acid, fumaric acid and maleic acid and separating the resulting acid salt from the reaction mixture.

7. The process for making N,N-diethyl pyridine-3-carboxylic acid amide tartrate which comprises reacting N,N-diethyl pyridine-3-carboxylic acid amide with tartaric acid and separating the resulting acid salt from the reaction mixture, said salt being solid at ordinary temperatures.

8. The process for making N,N-diethyl pyridine-3-carboxylic acid amide oxalate which comprises reacting N,N-diethyl pyridine-3-carboxylic acid amide with oxalic acid and separating the resulting acid salt from the reaction mixture, said salt being solid at ordinary temperatures.

9. The process for making N,N-diethyl pyridine-3-carboxylic acid amide fumarate which comprises reacting N,N-diethyl pyridine-3-carboxylic acid amide with fumaric acid and separating the resulting acid salt from the reaction mixture, said salt being solid at ordinary temperatures.

10. The process for making N,N-diethyl pyridine-3-carboxylic acid amide maleate which comprises reacting N,N-diethyl pyridine-3-carboxylic acid amide with maleic acid and separating the resulting acid salt from the reaction mixture, said salt being solid at ordinary temperatures.

References Cited in the file of this patent

UNITED STATES PATENTS

| Number | Name | Date |
| --- | --- | --- |
| 1,938,253 | Hartman | Dec. 5, 1932 |
| 2,317,309 | Stenzl | Apr. 20, 1943 |
| 2,352,012 | Rosicky | June 20, 1944 |

FOREIGN PATENTS

| Number | Country | Date |
| --- | --- | --- |
| 587,810 | Great Britain | May 6, 1947 |

OTHER REFERENCES

Kofler, Berichte, vol 76B, pp. 718–722 (1943).
U. S. Dispensatory, 24th ed., 1944, page 744.
Jenkins, "Chemistry of Organic Medicinals," J. Wiley and Sons (1941), page 490.
Smith, J. American Med. Assoc., vol. 118, Mar. 28, 1942, p. 1052.